United States Patent [19]

Whitney et al.

[11] 3,886,193
[45] May 27, 1975

[54] PREPARATION OF AROMATIC COMPOUNDS VIA BENZYNE INTERMEDIATES

[75] Inventors: Thomas A. Whitney, Roselle; Arthur W. Langer, Watchung, both of N.J.

[73] Assignee: Exxon Research and Engineering Company, Linden, N.J.

[22] Filed: Oct. 5, 1973

[21] Appl. No.: 404,022

Related U.S. Application Data

[63] Continuation-in-part of Ser. No. 138,766, April 29, 1971, Pat. No. 3,787,496.

[52] U.S. Cl............ 260/440; 260/239 E; 260/242; 260/250 R; 260/271; 260/279 R; 260/283 P; 260/283 R; 260/290 R; 260/293.63; 260/326.8; 260/448.2 N; 260/448.2 B; 260/570 P; 260/571; 260/573; 260/574; 260/576; 260/606.5 P; 260/937
[51] Int. Cl............................ C07j 9/74; C07j 9/28
[58] Field of Search ............... 260/440, 606.5 P

[56] References Cited
UNITED STATES PATENTS

| | | | |
|---|---|---|---|
| 2,437,795 | 3/1948 | Walling | 260/606.5 P |
| 2,437,797 | 3/1948 | Walling | 260/606.5 P |
| 3,064,055 | 11/1962 | Herring | 260/606.5 P |
| 3,396,197 | 8/1968 | Sharts | 260/606.5 P |
| 3,414,624 | 12/1968 | Peterson et al. | 260/606.5 P |

OTHER PUBLICATIONS
Aguair et al., J. Org. Chem. 28 (1963) p. 2091–2093.

*Primary Examiner*—Arthur P. Demers
*Attorney, Agent, or Firm*—Joheph A. Allocca

[57] ABSTRACT

A process for synthesizing substituted aromatic compounds characterized by the formula Ar(ZR$_2'$)$_y$, said process comprising reacting a halogenated aromatic compound in the presence of HZR$_2'$ with an alkali metal compound having the formula MZR$'_2$ and a tertiary amine selected from the group consisting of tris(-2-C$_1$–C$_4$-dialkylaminoethyl)amine, sparteine, C$_1$ to C$_4$-dialkylbispidins, an amine containing bridgehead nitrogen,

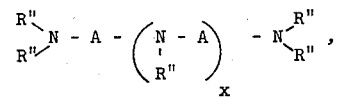

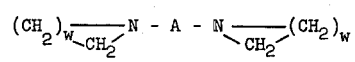

and

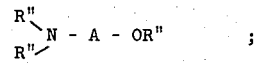

where M is Li or Na; R' is an inert monovalent radical containing 1 to 20 carbon atoms having a pK$_a$ greater than about 30; Z is an element selected from the group consisting of phosphorus, and arsenic, y is an integer of 1 to 6 inclusive; R" are the same or different C$_1$–C$_4$ alkyl radicals; x is an integer from 0 to 3 inclusive; w is an integer from 1 to 5; A is a nonreactive radical selected from the group consisting of (1) cycloaliphatic radicals and their lower alkyl derivatives having ring structures containing from 4 to 7 carbon atoms, wherein said radicals are attached to the nitrogen atoms at 1, 2 or 1, 3 positions on the rings, and (2) 1 to 4 methylenic radicals inclusive, wherein each methylenic radical contains 0 to 2 monovalent hydrocarbon radicals of 1 to 6 carbon atoms; Ar is an aryl group.

8 Claims, No Drawings

PREPARATION OF AROMATIC COMPOUNDS VIA BENZYNE INTERMEDIATES

CROSS REFERENCE TO RELATED APPLICATIONS

This application is a continuation-in-part of copending application Ser. No. 138,766 filed Apr. 29, 1971, now U.S. Pat. No. 3,787,496.

This invention relates to the synthesis of substituted aromatic compounds containing nitrogen, phosphorus or arsenic. In one aspect, this invention relates to the use of alkali metal compounds complexed with a tertiary amine in forming substituted aromatic compounds. In another aspect, this invention explains a new method for generating aryne intermediates under mild conditions in media which include saturated hydrocarbons.

The reaction of aryl halides with strong bases (e.g. $OH^-$, $NH_2^-$, $C_6H_5^-$) has been extensively investigated. In these reactions, "rearranged" products appear in which the nucleophile is ortho to the site of a starting halogen. In addition, the expected displacement product characteristic of these reactions is obtained. This unusual result led to numerous synthetic applications and a reasonable amount of confusion regarding the mechanism of the reaction. The confusion has been resolved by the conclusive demonstration that an aryne intermediate is a major reaction pathway to product (both "rearrangement" and "displacement") in a number of reaction systems: the amination of chlorobenzene with potassium amide in liquid ammonia, the reaction of aryl fluorides with phenyllithium in ether and the hydrolysis of the halotoluenes at 340°C. have been reviewed in the literature.

In an article entitled "The reaction of Phenyllithium and the Holotoluenes, Completing Aryne, Displacement, and Hologen-Metal Exchange Processes" (Lester Friedman and Jan F. Chlebowski, *Journal of the American Chemical Society*, 91, Aug. 13, 1969), the authors have studied the mechanism of aryne formation via a two-step process.

In the first step, proton abstraction occurs in order to generate the otho-halo aryl carbanion which subsequently eliminates halide to form the aryne. In the second step, the aryne then undergoes nucleophilic attack at either site to yield product carbanions corresponding to both rearrangement and displacement. More specifically, halotoluenes were reacted with phenyllithium in benzene-diethylether in the presence of catalytic amounts of N,N,N',N'-tetramethylethylene-diamine (TMEDA) under conditions which avoided an excess of the lithium reagent relative to the halo aromatic compound thereby producing only a small amount of benzyne which reacted with phenyllithium to yield phenyltolyllithium. The reaction mixtures were quenched with ethanol yielding small amounts of phenyltoluene.

In another article published in Chem. Ber. 103, 1440-1455 (May of 1970), Effenberger, Auer and Fischer describe the preparation of N,N',N''-hexaalkyl substituted 1,3,5-triaminobenzenes by the reaction of holobenzenes with secondary amines and phenyllithium. The authors then go on to draw conclusions about the reaction steps, (metalation, elimination and addition to the benzyne) from the structure and isomer distribution of the products.

The objects of our invention is to react hologenated aromatic compounds under specific processing conditions with a compound capable of generating an aryne intermediate so as to effect a displacement of the halide or halides located on the ring portion of aromatic compounds to produce compounds which were heretofore either unattainable or else very difficulty obtainable by known chemical synthesis routes; another object is to provide an improved process for carrying out selective reactions under mild conditions in hydrocarbon solvents.

Briefly, the invention relates to a process for synthesizing substituted aromatic compounds characterized by the formula $Ar(ZR_2')_y$, said process comprising reacting a halogenated aromatic compound in the presence of $HZ_2'$ with an alkali metal compound having the formula $MZR_2'$ and a tertiary amine selected from the group consisting of tris-(2-$C_1$-$C_4$-dialkylaminoethyl)amine, sparteine, $C_1$ to $C_4$-dialkylbispidins, an amine containing bridgehead nitrogen,

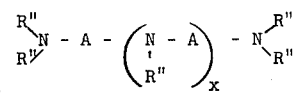

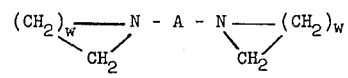

and

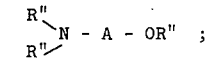

M is Li or Na; R' is an inert monovalent radical containing from 1 to 20 carbons having a $pK_a$ greater than about 30; Z is an element selected from the group consisting of phosphorus and arsenic; y is an integer from 1 to 6 inclusive; R'' are the same or different $C_1$-$C_4$ alkyl radicals; x is an integer from 0 to 3 inclusive; w is an integer from 1 to 5; A is a nonreactive radical selected from the group consisting of (1) cycloaliphatic radicals and their lower alkyl derivaties having ring structures containing from 4 to 7 carbon atoms, wherein said radicals are attached to the nitrogen atoms at 1, 2 or 1, 3 positions on the rings, and (2) 1 to 4 methylenic radicals inclusive, wherein each methylenic radical contains 0 to 2 monovalent hydrocarbon radicals of 1 to 6 carbon atoms; Ar is an aryl group, preferably containing from 1-4 rings.

The general reaction for the metalation step of this invention is as follows:

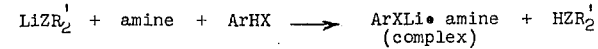

The above general reaction may be illustrated with lithium dipropylamide, N,N,N',N'-tetramethylethanediamine (TMEDA) and o-dichlorobenzene:

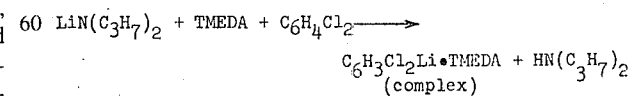

As may be seen from the above equations, the reaction will proceed satisfactorily so long as the halogenated aromatic compound is sufficiently acidic. In the general reaction, ArHX has about the same or greater kinetic or thermodynamic acidity then $HZR_2'$.

The metalated aryl halide eliminates metal halide to form an aryne intermediate as shown for o-dichlorobenzene:

In the presence of HZR$_2'$, the aryne intermediate is rapidly converted to a monosubstituted chlorobenzene product:

Reaction with additional organometallic complex results in metalation ortho to the two electron withdrawing groups, formation of another aryne, and addition of HZR$_2'$ to produce a meta disubstituted product:

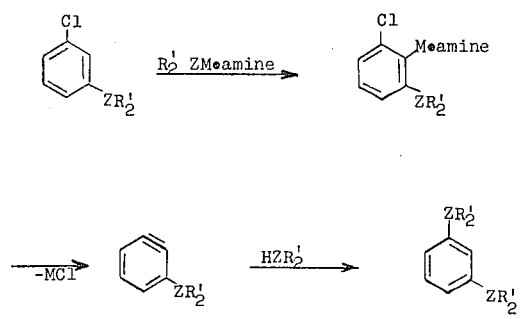

The hzb$'_2$ os a secondary phosphine or arsine in which R' is a monovalent radical which may contain inert heteroatoms, such as nitrogen, phosphorus, silicon, oxygen and sulfur, provided that the pK$_a$ of the most acidic hydrogen in the R' group is greater than about 30 on the MSAD scale (Cram, "Fundamentals of Carbion Chemistry", 1965, p. 19). The structure of R' is not critical as long as it has a pK$_a$ more than 2 units higher than that of the phosphine or arsine hydrogen. Normally, the R' group will contain 1 to 20 carbon atoms and 0 to 5 heteroatoms. The most preferred R' groups are alkyl, cycloaklyl, aryl and aralkyl groups.

Examples of types HZR$_2'$ compounds which are useful in this invention include dimethylphosphine, dibutylphosphine, dicyclohexylphosphine, diphenylphospine, methyleicosylphosphine, methylphenylphosphine, bis(trimethylsilyl)phosphine, P,P',P'-triethylethylenediphosphine, 4-butoxybutyl butylphosphine, diphenylarsine, dibuthylarsine, dicyclohexylarsine, methylphenylarsine, isobutylmethylarsine, dihexadecylarsine, and the like. In addition, the R' groups may be connected to form cyclic, secondary phosphines, such as phospholane, phosphoriane, etc.

The tertiary chelating amines may be monomeric or polymeric wherein the monomeric units preferably contain about 3 to 30 carbon atoms. Suitably, the monomeric units have a structure within the scope of the general formulas:

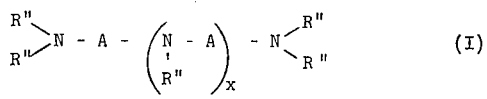

or

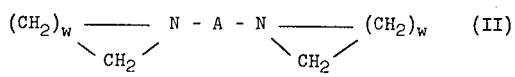

or

wherein the R'' radicals are the same or different $C_1$–$C_4$ alkyl radicals, preferably at least one R'' being a methyl radical; $x$ is an integer of 0 to 3 inclusive; $w$ is an integer of 1 to 5 inclusive and A is a non-reactive radical.

For the purposes of this invention, A in the above formulae is selected from the group consisting of: (1) cyclo-aliphatic radicals and their lower alkyl, e.g., $C_1$ to $C_4$ derivatives having ring structures containing 4 to 7 members, wherein said radicals are attached to the nitrogen atoms at 1,2 to 1,3 positions on the rings; suitable examples including N,N,N',N'-tetramethyl-cis-1,2-cyclopentanediamine, N,N,N',N'-cis-tetramethyl-1, 2-cyclohexanediamine, N,N,N',N'-tetramethyl-trans-1,2-cyclohexanediamine, hexamethyl-1,3,5-cyclohexanetreamine, N,N',N''-trimethyl-1,3,5-triazine, N-butyl-N,N',N'-trimethyl-1,2-cyclohexanediamine, and the like; and (2) 1 to 4 methylenic radicals inclusive, wherein each methylenic radical contains 0 to 2 monovalent hydrocarbon radicals of 1 to 6 carbon atoms; suitable examples include 1,2-dipiperidyl ethane, N,N'-dimethyl-N,N'-diethyl-1,2-ethanediamine, N,N,N',N'-tetramethyl-1-cyclohexyl-1,2-ethanedaimine, N,N,N',N'-tetramethyl-1,2-pentanediamine, N,N,N',N'-tetramethyl-1,2-propanediamine, N,N,N',N'-tetramethyl-2,3-butanediamine, N,N,N',N'-tetramethyl-1,4-butanediamine, beta-methoxyethyl dimethylamine, beta-ethoxyethyl diethylamine, and the like.

Examples of higher chelating polyamines include N,N,N',N'',N''-phentamethyl diethylenetriamine, N,N,N',N'',N''',N'''-hexamethyltriethylenetetramine, poly(N-ethyl ethylene imine), and the like.

Tertiary amines which do not fit the above formulas include tris-(2-$C_1$–$C_4$-dialkylaminoethyl)amine, specifically tris-(2-dimethylaminoethyl)amine (iso-HMTT), sparteine, $C_1$ to $C_4$-dialkylbispidins and tertiary amines containing bridgehead nitrogen. Examples of non-chelating bridgehead nitrogen compounds include 1,4-diaza[2,2,2]bicyclooctane (DABCO), quinuclidine, 1-aza[2,2,1]bicycloheptane, and the like.

Although the polyamines set forth hereinbelow are particularly preferred insofar as their availability and cost as well as stability of the complex prepared from such amines, care should nevertheless be taken in choosing a ployamine which has an acidity less than that of the hologenated aromatic compound to be employed in the reaction. In other words, the polyamine should be one which itself would not become metalted in preference to the metalation of the halogenated aromatic compound. Or, if metalated, it would transmetalate the halogenated aromatic compound without substantial decomposition.

The tertiary chelating polyamines are most preferred. Suitable examples of preferred chelating polyamines include: N,N-dimethyl-N',N'-diethyl-1,2-ethanediamine, N,N,N',N'-tetramethyl-1,2-ethanediamine (TMEDA), N,N,H',N'-tetraethyl-1,2-ethanediamine, N,N,N',N'-tetramethyl-1,3-propanediame, N,N, N',N'-tetramethyl-1,2-propanediamine, N,N,N',N'-tetramethyl-1,4-butanediamine, N,N,N',N'-tetramethyl-1,2-cyclohexane diamine (TMCHDA), N,N,N',N'',N''-pentamethyldiethylenetriamine (PMDT), N,N,N',N'',N''',N'''-hexamethyltriethylenetetramine (HMTT) and tris-(2-dimethylaminoethyl)amine (iso-HMTT).

Examples of aryl groups (Ar) useful in this invention include derivatives of benzenes, naphthalenes, anthracenes, pyridines, naphthyridines, phenanthenes, quinolines, paracyclophanes, quinoxalines, acridines and binaphthyls.

The halogens which are substituted onto the aromatic ring structure are ones selected from the group consisting of chlorine, bromine and fluorine. Other substituents may also be present in the haloaromatic substrate, such as alkyl, dialkylamine and ether groups, as long as these substituents have a $pK_a$ greater than about 30, do not undergo metalative decomposition by $MZR_2'$ and do not interfere with the formation of an aryne intermediate(s).

Examples of such halogenated aromatic compounds include m-n-hexyl-, o-cyclopentyl-, m-isopropyl-, p-2-ethyl-hexyl-, and m-3-phenylpropylchlorobenzene; m-bromophenyl phenyl ether; 2,3-dichloro-8-dimethylaminonaphthalene; 2,3,5-trichloro-9-cyclohexylanthracene; 3-fluoro-7-bromo-4-(p-tert-butylphenyl)-quinoline; 2,6-difluoronaphthyridine; 1,-4-dibromo-9-methylphenanthrene; 2,3-diphenyl-5-chloroquinoxaline and 2-chloro-5-ethyl[2,2]paracyclophane.

The processing conditions are as follows: the pressure is not critical and ranges from subatmospheric to superatmospheric and the temperature ranges from about −50° to +150°C; preferably the pressures range from 1 atmosphere to 10 atmospheres and the temperatures are from 0° to 100°C.

The mole ratio of $HZR_2'$ to the $MZR_2'$ is not critical and may range from 0 to 1 to 100 to 1 or higher. In the former case, additional $HZR_2'$ is produced from $MZR_2'$ when each metalation of the haloaromatic substrate occurs. The $HZR_2'$ so produced is then available to add to the aryne intermediate formed upon elimination of metal halide from the metalated haloaromatic species. In the latter case, $HZR_2'$ is in large excess, e.g., it may even be employed as the reaction solvent. Preferably, however, the mole ratio of $HZR_2'$ to $MZR_2'$ will be about 1:1 to 10:1.

The $MZR_2'$ may be prepared separately or in situ in the presence of halogenated aromatic compounds by any suitable method, such as the reaction of MR with $HZR_2'$ or the reaction of M with $ClZR_2'$, but it is preferably prepared by metalation of HZR' using a mixture of MR and a tertiary chelating polyamine which also facilitates the benzyne reaction. R is a monovalent alkyl, cycloalkyl, aryl, allyl, vinyl or aralkyl hydrocarbon radical containing 1 to 20 carbon atoms in which the parent RH has a $pK_a$ not less than about 23, preferably not less than about 33. For example, $HP(C_6H_{11})_2$ is metalated rapidly at 25°C. by BuLi·PMDT complex to form $PMDT·LiP(C_6H_{11})_2$, whereas the reaction is slow in the absence of PMDT. The PMDT·LiP $(C_6H_{11})_2$ complex may then react with a halogenated aromatic compound in the presence of $HP(C_6H_{11})_2$ to produce $Ar[P(C_6H_{11})_2]_y$. $MZR_2'$ may alternatively be prepared from chelated lithio or sodio radical anions. For example, hexamethyltriethylenetetramine·sodium naphthalide may be prepared by reacting the alkali metal, naphthalene, and chelating agent in a hydrocarbon such as benzene and further reacting with dipropyl phosphine to give $HMTT·NaP(C_3H_7)_2$.

In addition, the anion of the $MZR_2'$ compound used to metalate the halogenated aromatic compound may be different from the $HZR_2'$ compound which adds to the benzyne intermediate. For example, chel·$LiNMe_2$ and excess $HPBu_2$ may be used to produce the aryl dibutylphosphine product.

The mole ratio of chelating agent to alkali metal compound is normally between about 10:1 to 1:10, preferably 2:1 to 1:2, and most preferably 1:1.

The mole ratio of the halogenated aromatic compound to the alkali metal compound may range from 1 to 10 to 100 to 1, preferably 1:6 to 10:1, and most preferably the stoichiometric amount based on the number of aromatic halogens to be reacted (one $MZR_2'$ per halogen to be reacted).

When the $HZR_2'$ is not used as solvent, any inert solvent may be used, such as aliphatic, naphthenic or aromatic solvents or solvents containing inert substituents. The solvent must be less reactive than the aromatic halide toward metalative decomposition by the alkali metal compound. Representative of solvents useful in this invention are n-pentane, isohexane, heptane, hexadecane, cyclohexane, methylcyclohexane, methylcyclopentane, decahydronaphthalene, tetrahydronaphthalene, benzene, toluene, xylenes, t-butylbenzene, decylbenzene, ethylnaphthalene, tetraethylsilane, ethers, tertiary amines, and the like. Hydrocarbon solvents are most preferred.

Primary phosphines and arsines may also be used in this invention to produce the corresponding secondary amino- and phosphino-substituted aromatic compounds. In addition to the foregoing, this invention may also be used to prepare a wide variety of aryl substituted hydrazines and polyhydrazines starting with appropriate hydrazines containing at least one hydrogen attached to nitrogen. For example, if trimethylhydrazine is reacted with orthodichlorobenzene in the presence of chelated lithium trimethylhydrazide, the product is meta-bis-trimethylhydrazinobenzene.

EXAMPLE 1

To 85 ml. of a 1.6 molar solution of $n-C_4H_{99}$ Li in heptane (0.136 mole) was added a solution of 15.8 g. (0.136 mole) of tetramethylethylenediamine (TMEDA) in 80 ml. of heptane with stirring. The solution was aged 20 minutes and dimethylamine gas was bubbled into the TMEDA·n-BuLi until saturation of the reaction mixture with $HNME_2$ had occurred and all TMEDA·n-BuLi had been reacted to form TMEDA·$LiNMe_2$. A homogeneous solution resulted which was approximately 2M in $HNMe_2$. To the reaction mixture was then added dropwise a solution of 10.0 g. (0.068 mole) of ortho-dichlorobenzene in 70 ml. heptane at such a rate that the temperature of the reaction mixture was maintained at 45°C. After addition of o- dichlorobenzene was complete, the reaction mixture was stirred and maintained at 50°C. for 5 hours.

The reaction mixture was filtered and 6.2 g. of solids was removed (theory for LiCl = 6.0 g.) and the filtrate was evaporated on a rotary evaporator yielding an oil which was distilled, bp. 74–77°C./0.3 mm.; volume, 6.8 ml. The product was found to be meta-bis-dimethylaminobenzene by NMR and elemental analysis. Theory for $C_{10}H_{16}N_2$: C, 73.08%; H, 9.82%; N, 17.11%; found: C, 72.08%, H, 9.52%; N, 16.68%. The NMR spectrum of the product was superimposable with that of the published spectrum of meta-bis-dimethylaminobenzene. No ortho-product could be detected by NMR. By VPC analysis the product was >95% pure.

Thus reaction had occurred via at least one benzyne intermediate as a meta-disubstituted product was obtained from an ortho-disubstituted starting material. Hence chelated lithium dialkylamides generate benzyne intermediates from o-dihaloaromatics to give meta-disubstituted products.

EXAMPLE 2

Dimethylamine gas was bubbled into a solution of 0.44 g. (3 mmole) of m-dichlorobenzene in 5 ml. of heptane for 20 minutes. To the solution was then added 20 ml. of 0.5M TMEDA·LiNMe₂ in heptane with stirring under a nitrogen atmosphere. When addition of TMEDA·LiNMe₂ was complete, the reaction mixture was heated to 65°C. for 1.5 hours and was hydrolyzed with 10 ml. of water. The organic phase was dried over anhydrous $K_2CO_3$ and was analyzed by VPC and NMR. On a solvent-free basis the product was found to be 93% meta-bis-(dimethylamino)benzene.

Thus the results of Examples 1 and 2 indicate that a mixed ortho-meta-dihalobenzene feed also may be employed to produce an all meta-bis-dialkylaminobenzene product.

EXAMPLE 3

A 1.75 g. (9.64 mmole) portion of 1,3,5-trichlorobenzene was dissolved in 25 ml. of n-heptane. A stream of HNMe₂ gas was bubbled into the solution at a rate of about 100 ml. per minute for 30 minutes. Then 64 ml. of a 0.5 molar (32 mmole) solution of TMEDA·LiNMe₂ in heptane was added to the stirred reaction mixture over a period of 1.5 hours. (During the reaction a stream of HNMe₂ gas was bubbled into the reaction mixture at a rate of about 40 ml. per minute.) When addition of TMED·LiNMe₂ was complete, the reaction mixture was stirred at 50°C. for 1 hour and filtered. The residue weighed 1.22 g. (theory for 32 mmole of LiCl = 1.34 g.) and the filtrate was evaporated under vacuum to remove heptane and TMEDA. The product was found to be 1,3,5-tris-(dimethylamino)benzene by NMR analysis: two singlets at 5.5δ and 2.8δ in a ratio of 1 to 6.2.

Thus by means of this invention trisubstituted benzene derivatives are produced in which all three ortho-para-directing functional groups are meta to one another. Such compounds cannot be made directly by electrophilic aromatic substitution reactions.

EXAMPLE 4

Using the same conditions as described in Example 3, 1.0 g. (5.5 mmole) of 1,2,4-trichlorobenzene was reacted with 60 ml. of 0.5 molar TMED·LiNMe₂ in heptane. Work up of the reaction mixture gave 0.44 g. of LiCl and 1.7 g. of an oil which was found to be >90% 1,3,5-tris-(dimethylamino)benzene by NMR analysis. The production of a 1,3,5-substituted product from a 1,2,4-starting material requires at least one benzyne intermediate.

Similarly, 1.0 g. of 1,2,3-trichlorobenzene (5.5 mmole) was reacted with 30 mmole of 0.5M TMED·LiNMe₂ solution. The product was found by NMR analysis to contain a substantial percentage of 1,3,5-tris-(dimethylamino)benzene. The production of a 1,3,5-substituted benzene compound from a 1,2,3-substituted starting material requires at least two benzene intermediates.

EXAMPLE 5

A 25 ml. portion of 0.5M TMED·LiNMe₂ solution in benzene was saturated with HNMe₂ gas and 1.63 g. (10.5 mmole) of o-chloro-N,N-dimethylaniline in 4 ml. of heptane was added dropwise with stirring. When addition of the aromatic was complete, the reaction mixture was heated to 70°C. for 1.5 hours, filtered (0.36 g. LiCl recovered; theory = 0.42 g.) and evaporated under high vacuum at 60°C. for 30 minutes. The oily product, 1.45 g., was determined to be 98% pure by VPC analysis and was found to be meta-bis-(dimethylamino)benzene by NMR analysis. Thus an ortho disubstituted benzene derivative having one substituent a halogen atom may be converted to a meta-N,N-dialkylaniline product by means of the present invention.

EXAMPLE 6

By the same procedure described in Example 5, 12.5 mmoles of TMED·LiNMe₂ in heptane solution was reacted with 1.63 g. (10.5 mmole) of 3-chloro-N,N-dimethylaniline. The reaction mixture was worked-up as in Example 5 and the product was found to be meta-bis-(dimethylamino)benzene by VPC and NMR analysis.

EXAMPLE 7

To 50 ml. of 0.5M TMED·LiNMe₂ in heptane saturated with HNMe₂ at 25°C. was added 1.47 g. (10 mmole) of para-dichlorobenzene in 6 ml. of heptane dropwise. When addition of the p-$C_6H_4Cl_2$ was complete, the reaction mixture was slowly heated to 67°C. and was held at that temperature for 1.5 hours. The reaction mixture was filtered and the filtrate was stripped under high vacuum to remove heptane and TMED. The residue, wt. 1.55 g., was determined by VPC and elemental analysis to contain 41.5% meta-bis-(dimethylamino)benzene and 52.8% para-chloro-N,N-dimethylaniline.

The preparation of a meta-product from a para-starting material requires a benzyne intermediate.

EXAMPLE 8

A 4.96 g. (25 mmole) portion of dicyclohexylphosphine was dissolved in 30 ml. of benzene and to the solution was added 10.04 g. (~4.9 ml. or 25 mmole) of n-$C_4H_9Li$ in hexane. To the turbid mixture was added a solution of 4.33 g. (25 mmole) of pentamethyldiethylentriamine (PMDT) in benzene. A temperature rise to 48°C. was noted and a clear yellow solution of PMDT·LiP($C_6H_{11}$)₂ was obtained.

In a separate experiment LiP($C_6H_{11}$)$_2$ was prepared from HP($C_6H_{11}$)$_2$ and n-$C_4H_9$Li in hexane-benzene as solvent and an equivalent of PMDT was added. Slow evaporation of the homogeneous solution afforded large, needle-like, yellow crystals which were analyzed: theory for $C_{21}H_{45}LiNP$: C, 66.81%; H, 12.01%; N, 11.13%; found C, 66.57%; H, 11.74%; N, 10.93%.

The PMDT·LiP($C_6H_{11}$)$_2$ solution was transferred to a dropping funnel and added slowly to a solution of 1.47 g. (10 mmole) ortho-dichlorobenzene and 1.98 g. (10 mmole) of dicyclohexylphosphine in 40 ml. of benzene with stirring. An exothermic reaction occurred. When addition was complete the turbid, red reaction mixture was stirred at 30° to 40°C. for 1 hour and then heated to 60° for 1.5 hours. The reaction mixture was then filtered removing 0.35 g. of white solid, washed with 10 ml. of $H_2P$, 100 ml. of 1M HCl and 20 ml. of $H_2O$ in that order and dried over anhydrous $Na_2SO_4$. The solvents were stripped from the product at 25°C. and 2 mm pressure yielding 6.75 g. of oily residue. Benzene, 25 ml., was added to the residue followed by 4.72 g. of a hexane solution of n-$C_4H_9$Li (11.8 mmoles) with stirring. The mixture was stirred for one-half hour and filtered, removing 1.78 g. of solids.

The filtrate was again washed with water and aqueous HCl and dried as detailed above and the solvents were removed under reduced pressure yielding a residu, wt. 4.6 g. The residue was subjected to vacuum distillation up to 150°C. pot temp. at 0.2 mm. About two-thirds of the material distilled. The pot residue was examined by IR and NMR analysis. The infrared analysis indicated the absence of phosphorus-hydrogen bonds in the undistilled portion of the product and the NMR spectrum of same contained absorptions for cyclohexyl groups and a dissymmetric aromatic nucleus in a ratio of nearly 11:1. The latter absorption is characteristic of a meta-disubstituted benzene derivative.

This example demonstrates that chelated lithium dialkylphosphides and ortho-dihaloaromatic compounds yield meta-bis(dialkylphosphino) aromatic products.

In a control experiment in the absence of PMDT, there was no reaction of LiP($C_6H_{11}$)$_2$ with ortho-dichlorobenzene at room temperature.

EXAMPLE 9

To a solution of 10 mmoles of tris-(β-dimethylaminoethyl)amine·$LiNMe_2$ in 25 ml. of heptane saturated with $HNMe_2$ is added 4.5 mmoles of 1-fluoro-2-bromobenzene in 15 ml. of heptane. When addition is complete the reaction mixture is heated to 90°C. for 30 minutes, filtered, the solvents are removed under reduced pressure and meta-bis-dimethylaminobenzene is recovered.

EXAMPLE 10

The procedure of Example 1 is followed except that 5 mmoles of sparteine·LiN($C_6H_{11}$)$_2$ in iso-octane is added to 250 mmoles of ortho-dichlorobenzene in toluene containing 50 mmoles of HN($C_6H_{11}$)$_2$. When reaction is complete meta-chloro-N,N-dicyclohexylaniline is recovered.

EXAMPLE 11

Using the procedure of Example 10, 100 mmoles of N,N,N',N'-tetramethyl-1,2-butanediamine·LiN($C_8H_{17}$)$_2$ in benzene is added to 16 mmole of ortho-dibromobenzene in diethyl ether containing 2 mmole of HN($C_8H_{17}$)$_2$ at 0°C. From this reaction mixture is recovered meta-bis-dioctylaminobenzene.

It was shown by NMR analysis that diethyl ether in a benzene solution of chelated lithium dialkylamide was sufficiently resistant to metalative decomposition to be employed as a solvent or as a component of a mixed solvent system in this invention.

EXAMPLE 12

A mixture of 10 mmoles of trans-TMCHDA·$LiNMe_2$, 90 mmoles of $LiNMe_2$ and 200 mmoles of $HNMe_2$ in benzene is added to 10 mmoles of ortho-dichlorobenzene in 10 ml. of pentane at 7°C. From the reaction mixture is recovered ortho-bis-dimethylaminobenzene.

EXAMPLE 13

A mixture of 50 mmoles of N,N,N',N'-tetraethylethylenediamine and 10 mmoles of Li piperidide in benzene is added to a mixture of 5 mmoles of ortho-dichlorobenzene in benzene containing 20 mmoles piperidine at 40°C. From the reaction mixture is recovered meta-dipiperidylbenzene.

EXAMPLE 14

The procedure of Example 1 is followed except that 10 mmoles phenylsodium and 10 mmoles N,N,N',N',N'',N''-hexamethyltriethylenetetramine (HMTT) are combined in 100 ml. benzene solvent and excess dimethylamine is added to produce HMTT·$NaNMe_2$. After dropwise addition of 5 mmoles o-dichlorobenzene in 25 ml. benzene, the mixture is heated 2 hours at 50°C., the insoluble NaCl is removed by filtration and meta-bis(dimethylamino)benzene is recovered by distillation.

EXAMPLE 15

The procedure of Example 14 is followed except that benzylsodium·PMDT is reacted with 20 mmoles dibutylphosphine to produce PMDT·$NaPBu_2$. Reaction with 5 mmoles o-dichlorobenzene produces meta-bis(dibutylphosphino)benzene.

EXAMPLE 16

Following the procedure of Example 2 ortho-dichlorobenzene is reacted with beta-methoxyethyl dimethyl amine·$LiNMe_2$ in the presence of $HNMe_2$ yielding meta-bis(dimethylamino)benzene.

EXAMPLE 17

Iso-HMTT·LiAs($C_6H_{11}$)$_2$ in heptane solution is reacted with one-half an equivalent of ortho-dichlorobenzene in the presence of HAs($C_6H_{11}$)$_2$. Meta-bis(dicyclohexylarsino)benzene is produced.

EXAMPLE 18

A solution of $LiNMe_2$ containing two equivalents of DABCO in benzene is reacted with one-half an equivalent, based on $LiNMe_2$, of ortho-dibromobenzene in the presence of $HNMe_2$. Meta-bis(dimethylamino)benzene is produced.

EXAMPLE 19

To a solution of 10 mmoles of 2,3-dichloronaphthalene in benzene saturated with $HNMe_2$ is added dropwise a solution of 22 mmoles of TMEDA·LiNMe₂ in heptane. From the reaction mixture is obtained 1,3-bis(dimethylamino)naphthalene.

EXAMPLE 20

To a solution of 10 mmoles of 6,7-dichloro-1,1'-binaphthyl in benzene saturated with HNMe₂ is added dropwise a solution of 22 mmoles of TMEDA·LiNMe₂ in heptane. Reaction occurs to yield a mixture of 5,7-bis(dimethylamino)-1,1'-binaphthyl and 6,8-bis(dimethylamino)-1,1'-binaphthyl.

EXAMPLE 20

Following the procedure of Example 8, 20 mmoles of PMDT·LiP(C₆H₅)₂ in benzene is reacted with 10 mmoles of ortho-dibromobenzene in the presence of 20 mmoles of HP(C₆H₅)₂. From this reaction is recovered meta-bis(diphenylphosphino)benzene.

EXAMPLE 21

Following the procedure of Example 8, 30 mmoles of PMDT·LiP(C₆H₁₁)₂ in benzene is reacted with 10 mmoles of 1,3,5-tri-chlorobenzene in the presence of 50 mmoles of HP(C₆H₁₁)₂. From this reaction is recovered 1,3,5-tris(dicyclohexylphosphino)benzene.

EXAMPLE 21

Iso-HMTT·LiAs(C₄H₉)₂ in heptane solution is reacted with one-half an equivalent of ortho-dichlorobenzene in the presence of HAs(C₄H₉)₂. Meta-bis(dibutylarsino) benzene is produced.

What is claimed is:

1. A process for synthesizing substituted aromatic compounds characterized by the formula $Ar(ZR_2'$-$_y$, said process comprising reacting a halogenated aromatic compound, formula aromatic compound being one selected from the group consisting of derivatives of benzenes, naphthalenes, anthracenes, pyridines, naphthyridines, phenanthrenes, quinolines, paracyclophanes, quinoxalines, acridines, and binaphthyls, and substituted derivatives thereof, said substituents being ones selected from the group consisting of chlorine, bromine, fluorine, alkyl, dialkylamine and ethers, with the proviso that said substituents have a $pK_a$ greater than 30 and do not undergo metalative decomposition by $MZR_2'$ and do not interfere with the formation of an aryne intermediate, in the presence of excess $HZR_2'$ with an alkali metal compound, having the formular $MZR_2'$, and a tertiary amine selected from the group consisting of tris-(2-C₁–C₄-dialkylaminoethyl) amine, sparteine, C₁–C₄-dialkylbispidins, an amine containing bridgehead nitrogen,

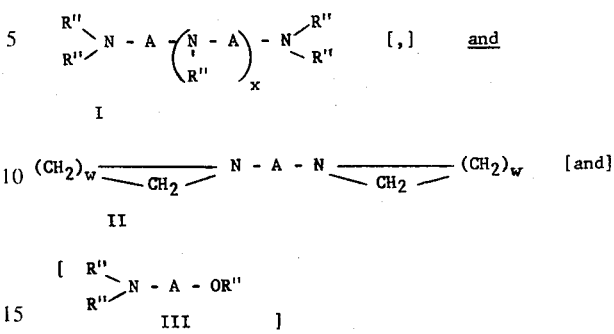

M is Li or Na; R' is an inert monovalent radical having a $pK_a$ greater than about 30; Z is an element selected from the group consisting of phosphorus and arsenic; y is an integer of 1 to 6 inclusive; R'' are the same or different C₁–C₄ alkyl radicals; x is an integer from 0 to 3 inclusive; w is an integer from 1 to 5; A is a nonreactive radical selected from the group consisting of (1) cycloaliphatic radicals and their lower alkyl derivatives having ring structures containing from 4 to 7 carbon atoms, wherein said radicals are attached to the nitrogen atoms at 1, 2 or 1, 3 positions on the rings, and (2) 1 to 4 methylenic radicals inclusive, wherein each methylenic radical contains 0 to 2 monovalent hydrocarbon radicals of 1 to 6 carbon atoms; Ar is the aryl portion of the aromatic compounds defined hereinabove, at a temperature ranging from −50° to 150°C.

2. A process according to claim 1 wherein the temperature ranges from 0° to 100°C.

3. A process according to claim 1 wherein the mole ratio of the halogenated aromatic compound to the alkali metal compound ranges from 1 to 10 to 100 to 1.

4. A process according to claim 1 wherein the halogen of the halogenated aromatic compound is one selected from the group consisting of F, Cl and Br.

5. A process according to claim 1 wherein the ratio of chelating agent to alkali metal compound is between 10:1 to 1:10.

6. A process according to claim 1 wherein said reaction occurs in the presence of a hydrocarbon solvent.

7. A process according to claim 1 wherein Z is phosphorus.

8. A process according to claim 1 wherein Z is arsenic.

* * * * *

UNITED STATES PATENT OFFICE
CERTIFICATE OF CORRECTION

Patent No. 3,886,193     Dated May 27, 1975

Inventor(s) Thomas A. Whitney, Arthur W. Langer, Jr.

It is certified that error appears in the above-identified patent and that said Letters Patent are hereby corrected as shown below:

Attorney, Agent or Firm - "Joheph A. Allocca should read -- Joseph A. Allocca --.
Column 2, line 16, "HZ$_2^!$" should read -- HZR$_2^'$ --.
Column 3, line 40, "hzb$_2^!$" should read -- HZR$_2^'$ --.
Column 4, line 47, "phentamel" should read -- pentamethyl -- ; line 62, "ployamine" should read -- polyamine -- .
Column 5, line 7, "N,N,H',N'-tetraethyl" should read -- N,N,N',N'-tetraethyl --.
Column 6, line 60, "HNME$_2$" should read -- HNMe$_2$ --.
Column 9, line 17, "H$_2$P" should read -- H$_2$O --.
Column 11, line 34, claim 1, "Ar(ZR$_2^!$)$_{-y}$" should read -- -- Ar(ZR$_2^!$)$_y$ --; line 36, "compound, formula aromatic" should read -- compound, said aromatic --.

Signed and Sealed this thirtieth Day of September 1975

[SEAL]

Attest:

RUTH C. MASON
Attesting Officer

C. MARSHALL DANN
Commissioner of Patents and Trademarks